(No Model.)

L. KONST.
FILTER FOR GASOLENE, &c.

No. 563,041. Patented June 30, 1896.

Witnesses.
C. F. Kilgore
F. D. Merchant

Inventor.
Louis Konst.
By his Attorney.
Jas. F. Williamson

ANDREW B.GRAHAM. PHOTO-LITHO. WASHINGTON.D.C.

UNITED STATES PATENT OFFICE.

LOUIS KONST, OF MINNEAPOLIS, MINNESOTA, ASSIGNOR OF ONE-HALF TO JAMES J. GERBER, OF SAME PLACE.

FILTER FOR GASOLENE, &c.

SPECIFICATION forming part of Letters Patent No. 563,041, dated June 30, 1896.

Application filed December 9, 1895. Serial No. 571,557. (No model.)

*To all whom it may concern:*

Be it known that I, LOUIS KONST, a citizen of the United States, residing at Minneapolis, in the county of Hennepin and State of Minnesota, have invented certain new and useful Improvements in Filters for Gasolene and other Liquids; and I do hereby declare the following to be a full, clear, and exact description of the invention, such as will enable others skilled in the art to which it appertains to make and use the same.

My invention has for its object to provide an improved filter or separator capable of general use, but especially designed for filtering gasolene to separate the impurities therefrom.

To these ends my invention consists of the novel features of construction and combinations of parts hereinafter described, and defined in the claims.

The preferred form of my invention is illustrated in the accompanying drawings, wherein, like letters referring to like parts throughout the several views—

Figure 1:
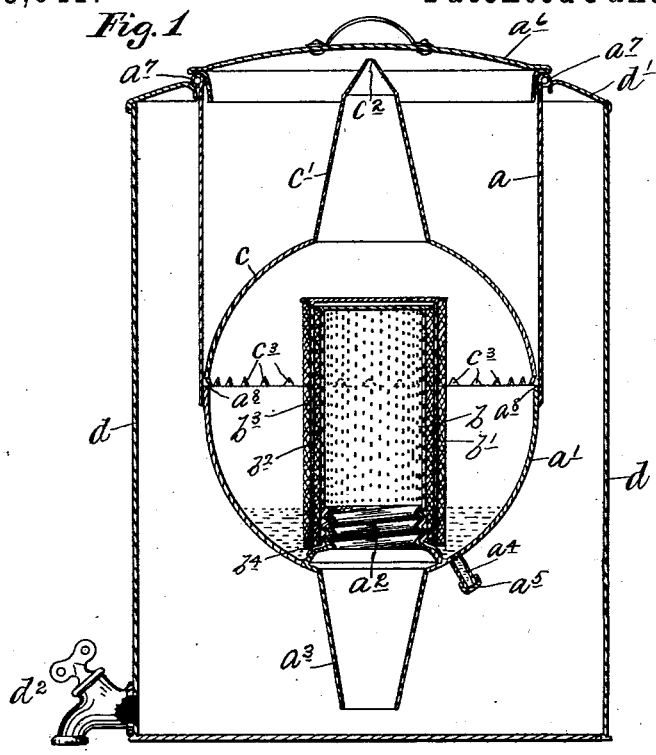
Figures 2, 3, 4:
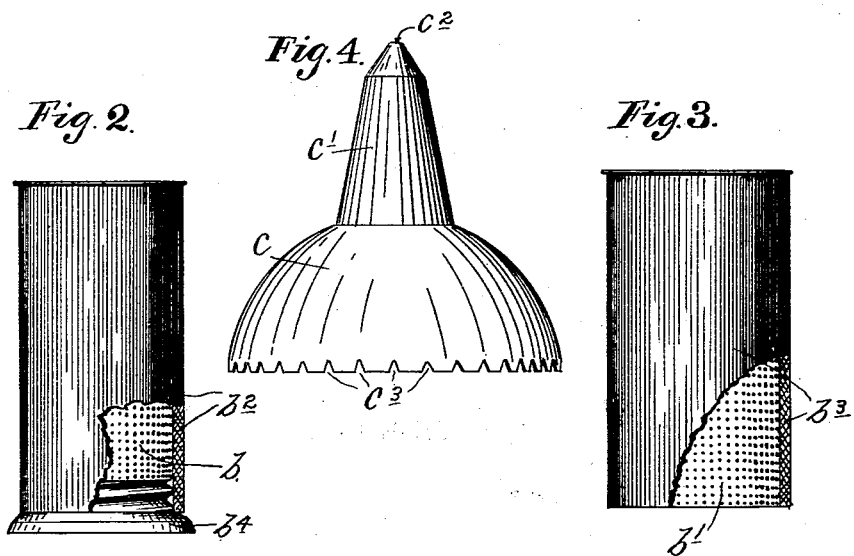

Figure 1 is a vertical section taken centrally through a filtering apparatus constructed in accordance with my invention. Figs. 2 and 3 are detail views in side elevation, some parts being broken away, showing parts of the straining devices removed from the filtering-can; and Fig. 4 is a detail view of a concavo-convex or dome-like deflector removed from the can.

As shown, the filtering-can is formed with a cylindrical body $a$ and a concave or hopper-like bottom $a'$. The said bottom or hopper-section is provided with a central inwardly-extending nipple $a^2$, and with an outwardly-extending delivery-spout $a^3$, communicating with the nipple $a^2$. As shown, the internal nipple $a^2$ is screw-threaded. The can is also shown as provided with a spout $a^4$, fitted with a head or plug $a^5$, for drawing off the dregs or waste, when so desired.

$a^6$ is a removable cover for the filtering-can, and $a^7$ is a top head or external flange on the can-rim for a purpose which will later appear.

In connection with the can proper, constructed as above described, I preferably employ a strainer composed of a pair of reticulated or perforated telescoping cylinders $b\ b'$ with coverings of textile fabric, (marked $b^2\ b^3$, respectively.) Preferably, these textile coverings are made from some loose porous material, such as wicking or felt cloth, but may be of any desired degree of fineness. Preferably, the outer member $b^3$ would be coarser than the inner member $b^2$. For some purposes the outer cylinder $b'$ and its covering $b^3$ may be dispensed with and the inner cylinder $b$ and covering $b^2$ alone used. The inner cylinder $b$ is provided with an internally-screw-threaded base $b^4$ at its lower end for engagement with the internal nipple $a^2$ to removably support the strainer in working position, as shown in Fig. 1. When the strainer is thus placed in working position, it will stand concentric with the walls of the filtering-can $a\ a'$. Over the top of this strainer $b\ b'\ b^2\ b^3$ and discharge-nipple $a^2$ is positioned, within the can, a suitable deflector, comprising, as shown, the dome-like concavo-convex body $c$ and conical stack or steeple $c'$ rising centrally therefrom and terminating in a peak with an air-hole $c^2$. As shown, the deflector-body $c$ rests loosely with its lower edge on a ledge or shoulder $a^8$, formed by the junction of the body $a$ and bottom $a'$ of the filtering-can, and the deflector is provided, on its lower edge or margin, with serrations or notches $c^3$, which permit the free passages therethrough of the unfiltered liquid.

The apparatus shown in the drawings includes, in addition to my novel filtering device above set forth, an exterior receptacle $d\ d'$, having a central opening in its top and a faucet or draw-off cock $d^2$ at or near its bottom level.

The filtering-can $a\ a'$ is shown as supported within the receptacle $d$ by the engagement of its annular bead $a^7$ with the annular head-flange $d'$ of said receptacle. The external receptacle, however, might be of any other form, and the filtering-can be supported in any other way.

The action of my improved filtering device is substantially as follows: The gasolene, or other oil or liquid, being poured into the can $a\ a'$ above the deflector $b$, will be directed by said deflector to the sides of the can, and be delivered therefrom, through the notches or serrations $c^3$, onto or against the downwardlyconverging walls of the concave bottom $a'$. As the liquid flows downward over the converging walls of the concave bottom $a'$ the lighter particles will of course rise, while the heavier particles will be precipitated against said converging bottom and thereby be carried to the lowest point. Hence the impure and heavy particles with which the gasolene or other liquid is charged, such as sand, dirt, and water, will be deposited in that portion of the bottom $a'$ which extends below the level of the mouth of the nipple $a^2$, as shown by dotted lines in Fig. 1, while the gasolene or lighter and pure parts of the liquid will overflow the mouth of said nipple and pass off therethrough. From the above it may be seen that in some cases liquids might be well filtered without the use of strainers, such as the cylinders $b$ $b'$ and covering $b^2$ $b^3$. For instance, in filtering oils, such as gasolene, which usually contains a small per cent. of water and other foreign substances, all of which are heavier than the oil, the water and other impurities would be deposited on the bottom $a'$ below the level of the mouth of said nipple $a^2$, from whence they can be drawn off through the dreg-pipe $a^4$. However, the strainers are preferably used in connection with the above construction, as they render the filtering action more perfect, in that they serve to stop all particles which, on account of their buoyancy or lightness, rise through the liquid.

By the use of the inclined bottom, raised nipple, and deflector, in connection with the strainer, as above set forth, the water and the heavy impurities of the oil will never be brought into contact with the strainer, as is the case with ordinary filters, wherein the strainer is relied on solely for the separation. Hence the impurities will not clog or fill the pores of the strainers, and the life of the straining cloths or covers $b^2$ $b^3$ will consequently be many times lengthened.

It will be observed that the air-hole $c^2$ in the peak of the dome-like deflector $c$ $c'$ is located above the highest possible level of the liquid in the can $a$ $a'$. The obvious purpose of this air-hole is to permit the displacement of the air under the deflector $c$ $c'$ by the liquid from the upper portion of said can $a$ $a'$ without causing the said deflector $c$ $c'$ to raise from its seat.

The can or receptacle $d$ forms no part of my invention, but is simply shown as a suitable means for supporting the particular form of filtering-can illustrated, and for catching the filtered liquid as it flows from the filtering-can.

It will be understood, of course, that various alterations in the details of the construction shown may be made without departing from the spirit of my invention.

This filter was especially designed for use in filtering gasolene, and by actual usage I have demonstrated its efficiency for that purpose. It gives large capacity in small compass, and makes a thorough separation.

What I claim, and desire to secure by Letters Patent of the United States, is as follows:

1. A filter for gasolene or other liquid, involving the combination with a vessel having a concave or hopper-like body, and provided with a central outlet pipe or nipple from a point above the lowest liquid-level of the same, of a strainer covering the passage of said nipple, and a dome or inverted-hopper-like deflector located in said vessel above said strainer and forming a loose joint at its periphery with the sides of said vessel, substantially as and for the purpose set forth.

2. A filter, for gasolene or other liquid, involving the combination with a vessel having a concave or hopper-like bottom and provided with a central outlet pipe or nipple from a point above the lowest liquid-level, of a central strainer supported by said nipple and a dome or inverted-hopper-like deflector fitting said vessel, above said strainer, provided with notches or liquid-passages on its margin and an air-escape passage at its tip, substantially as and for the purpose set forth.

3. The combination with the vessel $a$ $a'$, constructed as described, and having the central internal outlet-nipple $a^2$, of the strainer supported from said nipple and composed of the telescoping perforated cylinders $b$ $b'$ and the dome-like deflector $c$ in said vessel, above said strainer having the notches $c^3$ and the projection $c'$ with air-outlet $c^2$, all for coöperation, substantially as described.

In testimony whereof I affix my signature in presence of two witnesses.

LOUIS KONST.

Witnesses:
JAS. J. GERBER,
JAS. F. WILLIAMSON.